(12) United States Patent
Ege et al.

(10) Patent No.: US 12,163,339 B2
(45) Date of Patent: Dec. 10, 2024

(54) ADAPTABLE DOOR MOUNTING SUPPORT FOR POSITIONING AND INSTALLATION OF DOOR SLAB AND METHODS OF USE AND ASSEMBLY THEREOF

(71) Applicant: Masonite Corporation, Tampa, FL (US)

(72) Inventors: Patrick C. Ege, Westmont, IL (US); Jason M. Walsh, Batavia, IL (US); Robert C. Allen, Elburn, IL (US); Race C. Natta, Oak Park, IL (US); Brent Lindberg, Saint Charles, IL (US); Jae Young Jeon, Des Plaines, IL (US); Jonathan R. Zayat, Elgin, IL (US)

(73) Assignee: MASONITE CORPORATION, Tampa, FL (US)

( * ) Notice: Subject to any disclaimer, the term of this patent is extended or adjusted under 35 U.S.C. 154(b) by 196 days.

(21) Appl. No.: 17/993,054

(22) Filed: Nov. 23, 2022

(65) Prior Publication Data

US 2023/0160221 A1 May 25, 2023

Related U.S. Application Data

(60) Provisional application No. 63/282,975, filed on Nov. 24, 2021.

(51) Int. Cl.
*E04F 21/00* (2006.01)
*F16M 11/22* (2006.01)

(52) U.S. Cl.
CPC ......... *E04F 21/0023* (2013.01); *F16M 11/22* (2013.01); *F16M 2200/08* (2013.01)

(58) Field of Classification Search
CPC .............. E04F 21/0023; E04F 21/0007; E04F 21/0015; B25B 11/00; F16M 11/22; F16M 2200/08
(Continued)

(56) References Cited

U.S. PATENT DOCUMENTS 552,400 A * 12/1895 Spires ..................... B25B 11/00
269/254 R
689,376 A * 12/1901 Young ..................... B25B 11/00
269/237
(Continued)

FOREIGN PATENT DOCUMENTS

GB 2134433 A * 8/1984 .......... E04F 21/0023
GB 2255587 A * 11/1992 ............. B25B 11/00
(Continued)

*Primary Examiner* — Ryan D Kwiecinski
(74) *Attorney, Agent, or Firm* — CANTOR COLBURN LLP

(57) ABSTRACT

An adaptable door mounting support for acquiring a door gap and for supporting a door slab. The door mounting support comprises a frame member including first and second A-shaped segments interconnected by a rectangular bottom section and together defining a door support channel therebetween, and a tie device configured to meter the door gap and hold the door slab off the ground. A width of the door support channel is equal or larger than a thickness of the door slab. The tie device includes a cable tie extending between the A-shaped segments and across the door support channel, and a locking member attached to the cable tie by sliding over the cable tie. The locking member is slidable over the cable tie in one direction only and is lockable on the cable tie to adjust a distance between the cable tie and the bottom section of the frame member.

28 Claims, 8 Drawing Sheets

(58) Field of Classification Search
USPC .................. 206/321, 325; 269/905; 52/749.1
See application file for complete search history.

(56) References Cited

U.S. PATENT DOCUMENTS

| | | | | |
|---|---|---|---|---|
| 771,753 A * | 10/1904 | Stanley | ................... | B25B 11/00 269/133 |
| 848,837 A * | 4/1907 | Marz et al. | ......... | E04F 21/0007 269/237 |
| 960,258 A * | 6/1910 | Boudreau | ............... | B25B 11/00 248/165 |
| 1,042,232 A * | 10/1912 | Job | ......................... | B25B 11/00 269/248 |
| 1,446,309 A * | 2/1923 | Krohne | .................... | B25H 1/00 269/146 |
| 1,715,722 A * | 6/1929 | Smith | ....................... | B25B 5/00 248/166 |
| 2,605,795 A * | 8/1952 | Tracy | ...................... | B25B 11/00 269/133 |
| 2,621,687 A * | 12/1952 | Fordon | .................... | B25B 5/06 269/210 |
| 3,861,662 A * | 1/1975 | Morse | ..................... | B62B 1/268 269/904 |
| 3,871,054 A * | 3/1975 | Schaefer | ................. | B66F 15/00 254/8 R |
| 4,010,931 A * | 3/1977 | Wheeler | ................. | B66F 15/00 254/131 |
| 4,043,536 A * | 8/1977 | Almond | .................. | B62B 1/268 254/2 R |
| 4,141,192 A * | 2/1979 | Augustine | ........... | E04F 21/0023 52/749.1 |
| 4,168,827 A * | 9/1979 | Hutchinson | ............. | B25B 11/00 269/238 |
| 4,270,741 A * | 6/1981 | Hurst | ........................ | B25B 5/04 269/33 |
| 4,492,369 A * | 1/1985 | Pohl | ........................ | B66F 15/00 269/60 |
| D291,065 S * | 7/1987 | Pugh | ............................. | D9/418 |
| D297,502 S * | 9/1988 | Archambeau | .................... | D8/71 |
| 4,799,658 A * | 1/1989 | Ponce | ...................... | B25B 5/06 269/254 R |
| 4,884,687 A * | 12/1989 | Steves | ..................... | B65D 59/06 206/321 |
| 4,967,905 A * | 11/1990 | Steves | .................... | B65D 85/64 206/321 |
| 4,978,132 A * | 12/1990 | Wilson | ................ | E04F 21/0023 280/47.131 |
| 5,294,099 A * | 3/1994 | Dalfino | ................... | B25B 11/00 269/133 |
| 5,794,785 A * | 8/1998 | Simon | ................... | B65D 5/5009 206/757 |
| 5,927,731 A * | 7/1999 | Clarke | ................ | E04F 21/0023 280/47.24 |
| 6,022,008 A * | 2/2000 | Bachman | ................ | B66F 15/00 269/37 |
| 6,024,351 A * | 2/2000 | Metoyer | ..................... | E04F 21/003 269/133 |
| 6,231,034 B1 * | 5/2001 | Walker | ................ | E04F 21/0023 269/901 |
| 6,505,844 B2 * | 1/2003 | Hallman | ............. | E04F 21/0023 118/500 |
| 6,641,668 B1 * | 11/2003 | Edgerton | ............. | B05B 13/0285 269/53 |
| 6,886,821 B2 * | 5/2005 | Eberle, III | .......... | E04F 21/0023 269/286 |
| 7,040,583 B1 * | 5/2006 | Holland | ..................... | A47F 3/12 248/122.1 |
| 8,220,780 B2 * | 7/2012 | Guillore | .................. | B66F 15/00 254/131 |
| 8,398,062 B1 * | 3/2013 | Condit | .................... | B25B 11/00 269/254 R |
| 8,757,604 B2 | 6/2014 | Crampton | | |
| 9,586,309 B1 * | 3/2017 | Poulos | .................... | B25B 1/241 |
| 9,638,224 B1 * | 5/2017 | Westfall, II | ............... | F16B 2/10 |
| 10,005,173 B2 * | 6/2018 | Furey | ..................... | B25B 5/006 |
| 10,202,241 B2 * | 2/2019 | Valliere | .................... | B65G 1/14 |
| 11,828,093 B1 * | 11/2023 | Russo | ..................... | E05C 17/54 |
| 11,912,324 B1 * | 2/2024 | Livingston, Jr. | ....... | B62B 5/0093 |
| 2002/0113390 A1 * | 8/2002 | Hallman | ................. | B62B 3/108 280/43 |
| 2002/0125625 A1 * | 9/2002 | Klippel | ............... | E04F 21/0023 269/133 |
| 2004/0217532 A1 * | 11/2004 | Eberle, III | ............. | B25B 11/00 269/203 |
| 2009/0033014 A1 * | 2/2009 | Crampton | ........... | E04F 21/0023 269/203 |
| 2009/0096144 A1 * | 4/2009 | White | ....................... | B62B 3/02 280/43 |
| 2015/0020461 A1 * | 1/2015 | Galvez | ................ | E04F 21/1811 49/506 |
| 2017/0043454 A1 * | 2/2017 | Furey | ................... | E05B 17/0012 |
| 2018/0151157 A1 * | 5/2018 | Ng | .......................... | F16M 11/22 |
| 2019/0284822 A1 * | 9/2019 | Hayes | ..................... | B66F 15/00 |
| 2020/0017295 A1 * | 1/2020 | Duijts | ..................... | B65G 1/14 |
| 2020/0114946 A1 * | 4/2020 | Newenhouse | ...... | E04F 21/0023 |
| 2023/0160221 A1 * | 5/2023 | Ege | ..................... | E04F 21/0023 52/745.15 |

FOREIGN PATENT DOCUMENTS

| | | | | |
|---|---|---|---|---|
| GB | 2268395 A * | 1/1994 | ............ | B25B 11/00 |
| GB | 2278811 A * | 12/1994 | ............ | B62B 3/108 |
| GB | 2324562 A * | 10/1998 | .......... | E04F 21/0023 |
| GB | 2388066 A * | 11/2003 | ............ | B25B 1/103 |
| GB | 2394916 A * | 5/2004 | ............ | B25B 11/00 |
| GB | 2402094 A * | 12/2004 | ............ | B25B 11/00 |
| GB | 2405119 A * | 2/2005 | ............ | B25B 11/00 |
| GB | 2412081 A * | 9/2005 | ............ | B25B 1/16 |
| GB | 2413352 A * | 10/2005 | .......... | E04F 21/0023 |
| GB | 2420371 A * | 5/2006 | ............ | B25B 11/00 |
| GB | 2420736 A * | 6/2006 | ............ | B25B 11/00 |
| GB | 2435232 A * | 8/2007 | ............ | B25B 11/00 |
| WO | WO-2004101911 A1 * | 11/2004 | ............ | B25B 11/00 |
| WO | WO-2007096570 A1 * | 8/2007 | ............ | B25B 11/00 |

* cited by examiner

ADAPTABLE DOOR MOUNTING SUPPORT FOR POSITIONING AND INSTALLATION OF DOOR SLAB AND METHODS OF USE AND ASSEMBLY THEREOF

CROSS-REFERENCE TO RELATED APPLICATION AND CLAIM TO PRIORITY

This application claims the benefit of U.S. Provisional Patent Application Ser. No. 63/282,975 filed Nov. 24, 2021 by Ege et al., which is hereby incorporated herein by reference in its entirety and to which priority is claimed.

BACKGROUND OF THE INVENTION

1. Field of the Invention

The present invention is related to door slab installation tools and, more specifically, to an adaptable door mounting support and methods of use and assembly that allow a user to determine the distance between the bottom edge of an existing door slab mounted to a door frame and the underlying floor, and to preset the distance and to support a replacement door slab at that height above the floor (door gap) to facilitate installation of a replacement door slab to the door frame. Additionally, the adaptable door mounting support allows the top hinge of the existing door to be correspondingly set, so that the replacement door slab will have the top hinge located at the same location as the preexisting door slab.

2. Description of the Related Art

Existing exterior or interior doors are found everywhere for opening and closing access between two rooms or zones. Occasionally a door slab or doors slabs may need to be replaced and installed in the frame that previously held the door being replaced. Further, replacement of door slabs may be part of a home renovation project.

Currently it is quite difficult to replace a door, and it is a job that one of average do-it yourself (DIY) skills may not have the confidence to tackle. There are essentially two options if a door is to be replaced: one is to use a "pre-hung" door unit (i.e., including of a pre-hinged door slab that is already fastened to a prebuilt door frame), and the other is to replace the door slab using a professional installer while leaving the existing door frame in place. These difficulties may limit the willingness of homeowners to replace their existing doors.

Replacing a door slab with a pre-hung door unit requires the installer to remove the entire existing (or old) door slab and frame from an opening in a wall, and then install a replacement door slab and frame into the opening. This requires a higher level of DIY skill and knowledge. It can take a considerable amount of time and effort if one is not skilled in the procedure. Further, there is no genuine need for a replacement frame, so costs are needlessly increased.

Installing a replacement door slab presents its own unique challenges and is generally more difficult than installing a pre-hung door unit, especially for one with no prior experience. For example, during installation the installer typically needs to lift the replacement door slab into place, which can be awkward and difficult without two people, and then fasten the door slab to the frame. Moreover, the replacement door slab needs to be placed and supported at the same door gap as the existing door slab to facilitate installation of the replacement door slab to the door frame. Further, aid in balancing the replacement door slab and alignment of hinges is needed if the replacement door is to swing as did the original door. Existing supports are cumbersome and require many adjustments.

Therefore, a need exists for an adjustable door support for supporting and holding the replacement door slab at a predetermined distance from a floor to assist with accurately securing a replacement door slab to a door frame.

BRIEF SUMMARY OF THE INVENTION

According to a first aspect of the present invention, there is provided a system for installing a door slab in a door frame. The door gap is defined as the distance between the bottom edge of the door slab pivotally mounted to the door frame through door hinges and the floor. The door mounting support of the invention comprises a frame member including first and second A-shaped segments interconnected by a rectangular bottom section and together defining a door support channel therebetween adapted to receive a portion of the door slab therein, the width of the door support channel being equal to or larger than the thickness of the door slab, and at least one tie device configured to meter the door gap and hold the door slab in place at a height off the ground equal to the door gap. Each of the first and second A-shaped segments is formed with a corresponding first or second top ridge. The at least one tie device includes a cable tie extending between the first and second top ridges and across the door support channel and an adjustable locking member is attached to the cable tie by sliding over the cable tie. The adjustable locking member is slidable over the cable tie in one direction only and lockable on the cable tie to adjust the distance between the cable tie and the bottom section of the frame member.

According to a second aspect of the present invention, there is provided a method for assembling an adaptable door mounting support for acquiring the door gap and for supporting a door slab at a height off the floor equal to the door gap. The door gap is defined as the distance between the bottom edge of the door slab pivotally mounted to a door frame through door hinges and the floor. The method comprises the steps of providing a rectangular sheet. The rectangular sheet includes a plurality of parallel fold lines extending across an entire width of the rectangular sheet, first and second inner rectangular sections each separated from the corresponding one of the first and second outer rectangular sections by one of the fold lines, a rectangular bottom section extending between the first and second inner rectangular sections, the first and second inner rectangular sections interconnected by the rectangular bottom section, wherein each of the first and second inner rectangular sections separated from the rectangular bottom section by one of the fold lines, a first support tab formed on the first outer rectangular section along an outer edge thereof between a first foldable corner tabs and between two first indentations, and a second support tab formed on the second outer rectangular section along an outer edge thereof between a second foldable corner tabs and between two second indentations. Each of the first and second inner sections is formed with a U-shaped cut line adjacent to the bottom section, each of the U-shaped cut lines defining one of corresponding first fixing plate in the first inner section and a second fixing plate in the second inner section each juxtaposed to the bottom section from opposite sides thereof. Each of the first and second inner rectangular sections has at least one elongated tie aperture extending between the first and second inner rectangular sections through the bottom section. The first fixing plate is formed with a first elongated support opening. The second fixing plate is formed with a second elongated support opening. Each of the first and second elongated support openings extends parallel to the fold lines. The method further comprises the steps separating the first and second fixing plates and the first and second inner rectangular sections from the corresponding first and second inner rectangular sections along the cut lines so as to disconnect the first and second fixing plates from the corresponding first and second inner rectangular sections, folding the first and second inner sections relative to the bottom section, folding the first and second outer sections at an acute angle relative to the corresponding one of the first and second inner sections, inserting the first and second support tabs into the first and second support openings to form and secure first and second A-shaped segments each in an upright position relative to the bottom section, each of the first and second A-shaped segments formed with a corresponding first or second top ridge, providing at least one tie device, each of the tie devices including a cable tie and an adjustable locking member slidable over the cable tie, passing the cable tie of the at least one tie device between the first and second top ridges and through the at least one elongated tie aperture, and attaching the locking member of the at least one tie device to a free distal end of the cable tie by sliding over the cable tie.

According to a third aspect of the present invention, there is provided a method of using an adaptable door mounting support for acquiring the door gap and for supporting a door slab at a height off the floor equal to the door gap. The door gap is defined as the distance between the bottom edge of the door slab pivotally mounted to a door frame through door hinges and the floor. The method comprises the steps of providing an adaptable door mounting support including a frame member and at least one tie device configured to meter the door gap and hold the door slab in place at the height off the ground equal to the door gap. The frame member has first and second A-shaped segments interconnected by a rectangular bottom section and together defining a door support channel therebetween adapted to receive a portion of the door slab therein. Each of the first and second A-shaped segments is formed with a corresponding first or second top ridge. The at least one tie device includes a cable tie and an adjustable locking member attachable to the cable tie by sliding over the cable tie and lockable on the cable tie to adjust the distance between the cable tie and the bottom section of the frame member. Next, the cable tie of the at least one tie device is passed through both of the inner rectangular sections of the pre-shaped rectangular sheet and the locking member is attached to free distal end of the cable tie. Then, the door mounting support is positioned under the door slab hung on the door frame so that the first and second A-shaped segments and the rectangular bottom section lay on the floor and a portion of the bottom edge of the door slab is disposed in the door support channel. Then, the door gap is acquired by pulling and raising the cable tie so as to engage the bottom edge of the door slab. Next, the door support is locked into shape by pulling on the cable tie and using the locking member to lock the door support once the cable tie of the door mounting support reaches the height of the door gap.

According to a fourth aspect of the present invention, there is provided a method for installing a replacement door slab in a door frame, the method comprising the steps of providing an adaptable door mounting support including a frame member and at least one tie device, the frame member including first and second A-shaped segments interconnected by a bottom section and together defining a door support channel therebetween adapted to receive a portion of the door slab therein, the at least tie device including a cable tie extending across the door support channel and a locking member attached to the cable tie by sliding the locking member over the cable tie, positioning the door mounting support under the bottom edge of the existing door slab hung on the door frame so that the bottom edge of the existing door slab is disposed in the door support channel of the door mounting support above the cable tie of the at least tie device, acquiring the door gap (defined as a distance between the bottom edge of the existing door slab and the floor) by pulling the cable tie so that a portion of cable tie is raised to touch the bottom edge of the existing door slab, locking the cable tie in place by pushing the locking member toward one of the A-shaped segments, removing the existing door slab from the door frame and from the door mounting support, placing the replacement door slab on the cable tie in the door support channel of the door mounting support, and securing the replacement door slab to the door frame by the door hinges.

Other aspects of the invention, including systems, devices, methods, and the like which constitute parts of the invention, will become more apparent upon reading the following detailed description of the exemplary embodiments.

BRIEF DESCRIPTION OF THE DRAWINGS

The accompanying drawings are incorporated in and constitute a part of the specification. The drawings, together with the general description given above and the detailed description of the exemplary embodiments and methods given below, serve to explain the principles of the invention. In such drawings.

DETAILED DESCRIPTION OF EXEMPLARY EMBODIMENTS

Figure 1A:
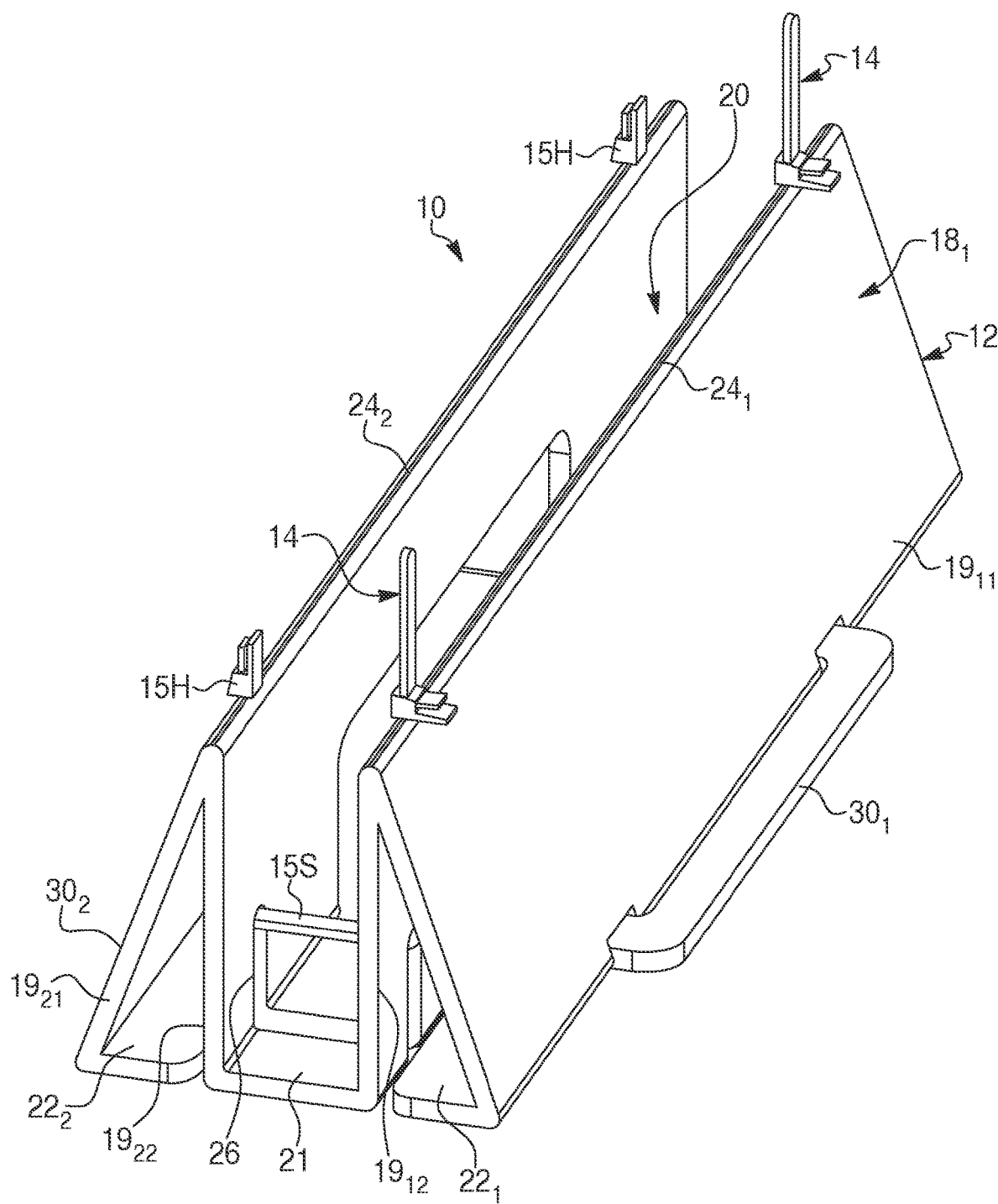
FIG. 1A is a perspective view of a door mounting support according to an exemplary embodiment of the present invention from a first side.

Reference will now be made in detail to the exemplary embodiments and exemplary methods as illustrated in the accompanying drawings, in which like reference characters designate like or corresponding parts throughout the drawings. It should be noted, however, that the invention in its broader aspects is not necessarily limited to the specific details, representative materials and methods, and illustrative examples shown and described in connection with the exemplary embodiments and exemplary methods.

This description of exemplary embodiments is intended to be read in connection with the accompanying drawings, which are to be considered part of the entire written description. In the description, relative terms such as "horizontal,"

"vertical," "front," "rear," "upper," "lower," "top" and "bottom" as well as derivatives thereof (e.g., "horizontally," "vertically," "downwardly," "upwardly," etc.) should be construed to refer to the orientation as then described or as shown in the drawing figure under discussion and to the orientation relative to a vehicle body. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. The term "integral" (or "unitary") relates to a part made as a single part, or a part made of separate components fixedly (i.e., non-moveably) connected together. Additionally, the word "a" and "an" as used in the claims means "at least one" and the word "two" as used in the claims means "at least two".

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

Figure 1B:
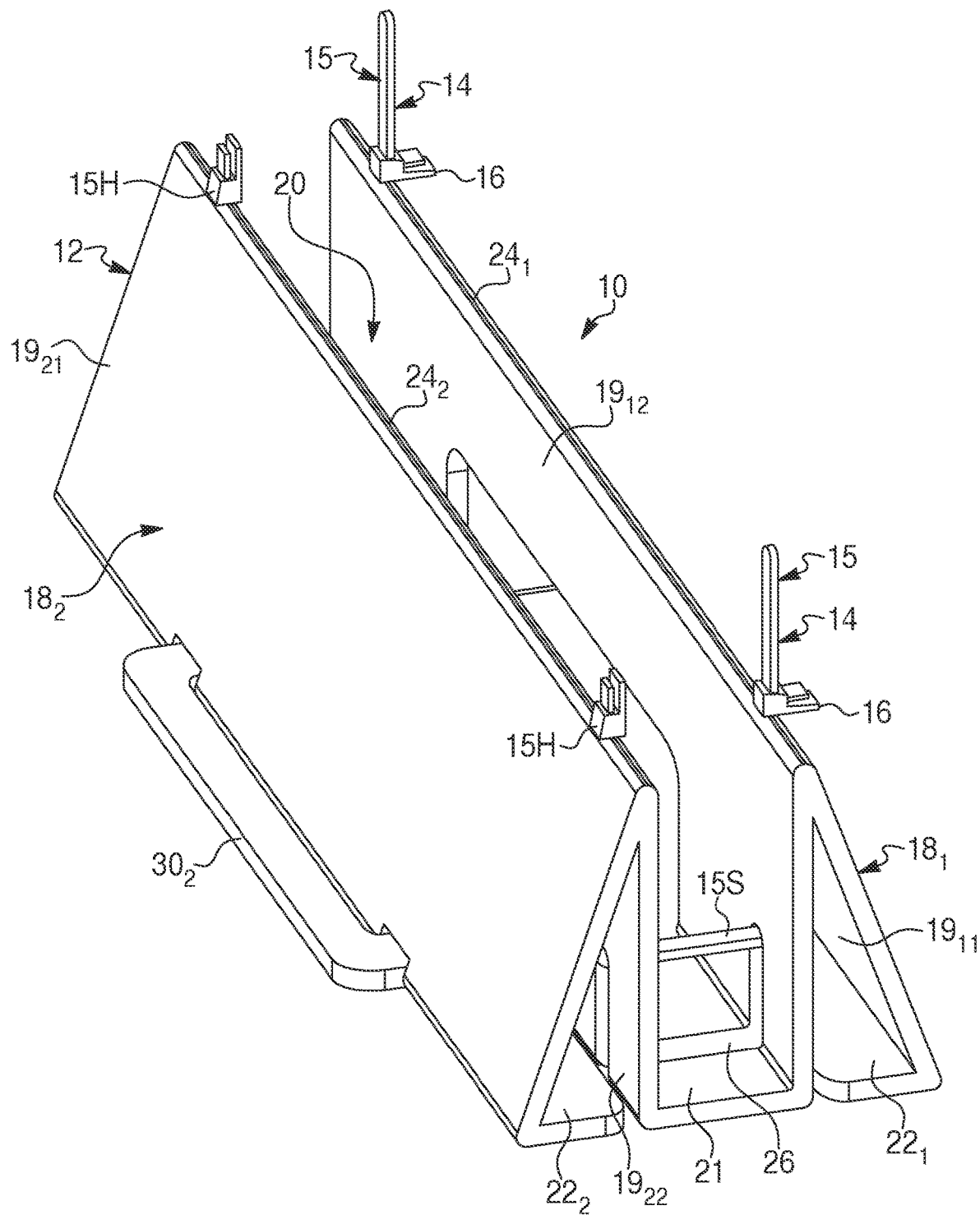
FIG. 1B is a perspective view of the door mounting support from a second side.
Figure 2:
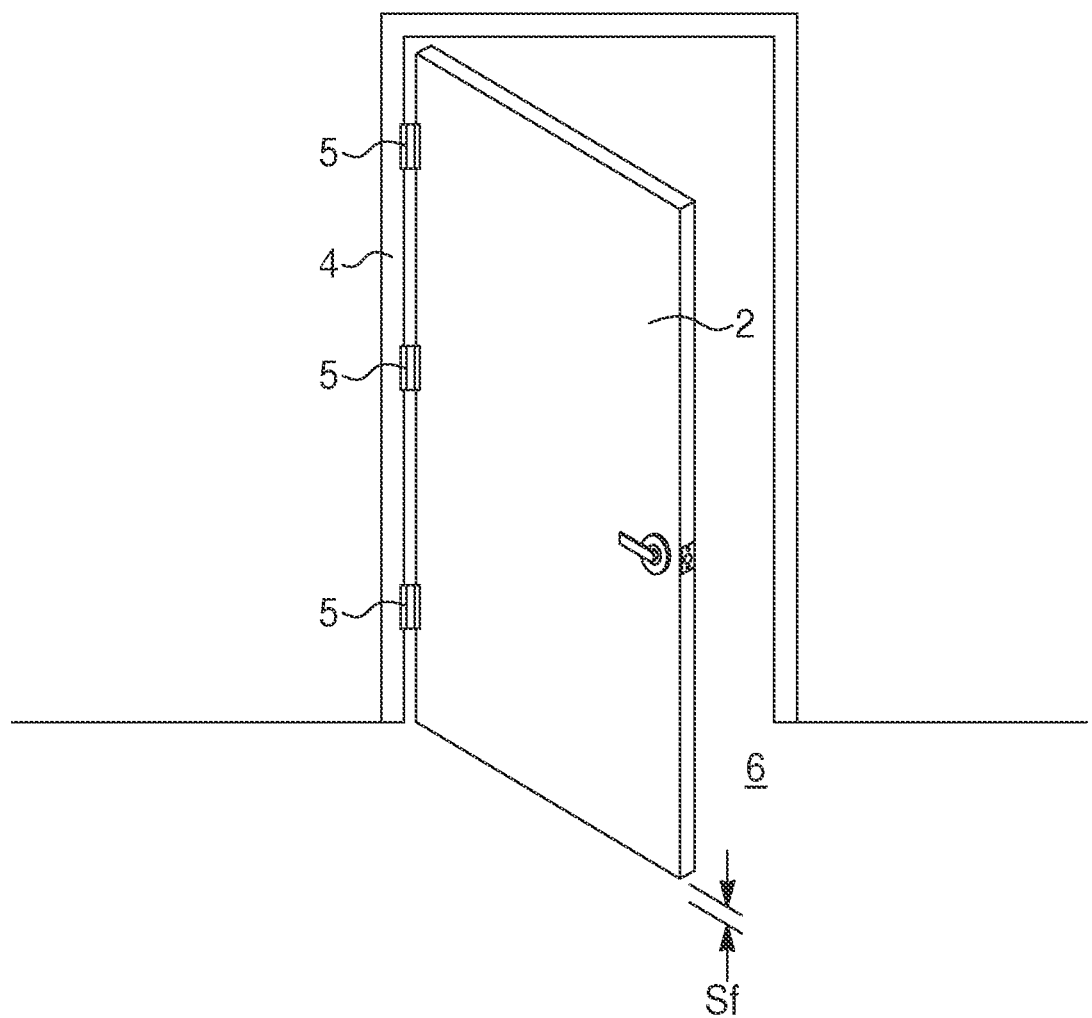
FIG. 2 is a perspective view of a door slab mounted to a door frame.
Figure 3:
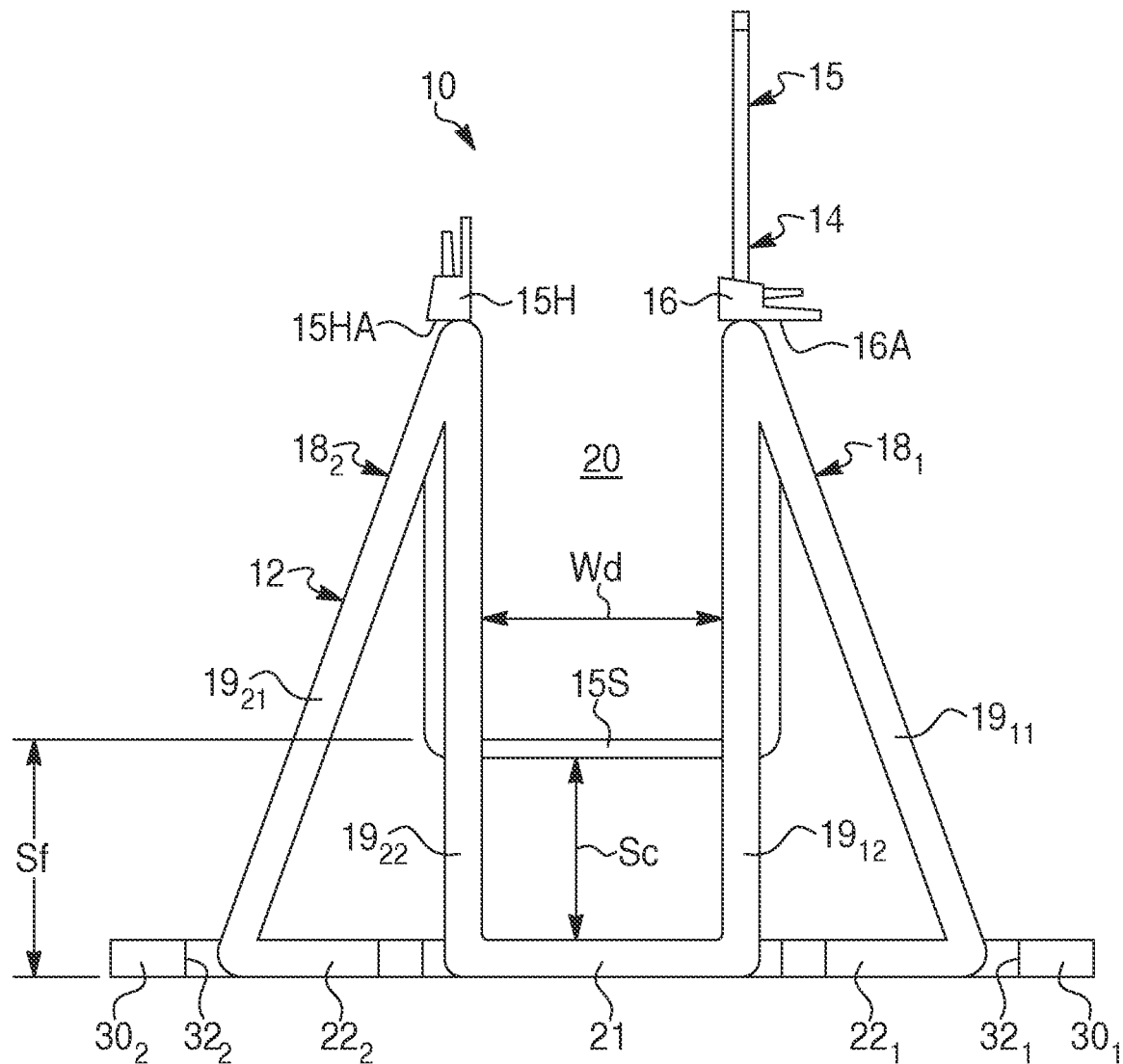
FIG. 3 is a side view of the door mounting support.
Figure 4:
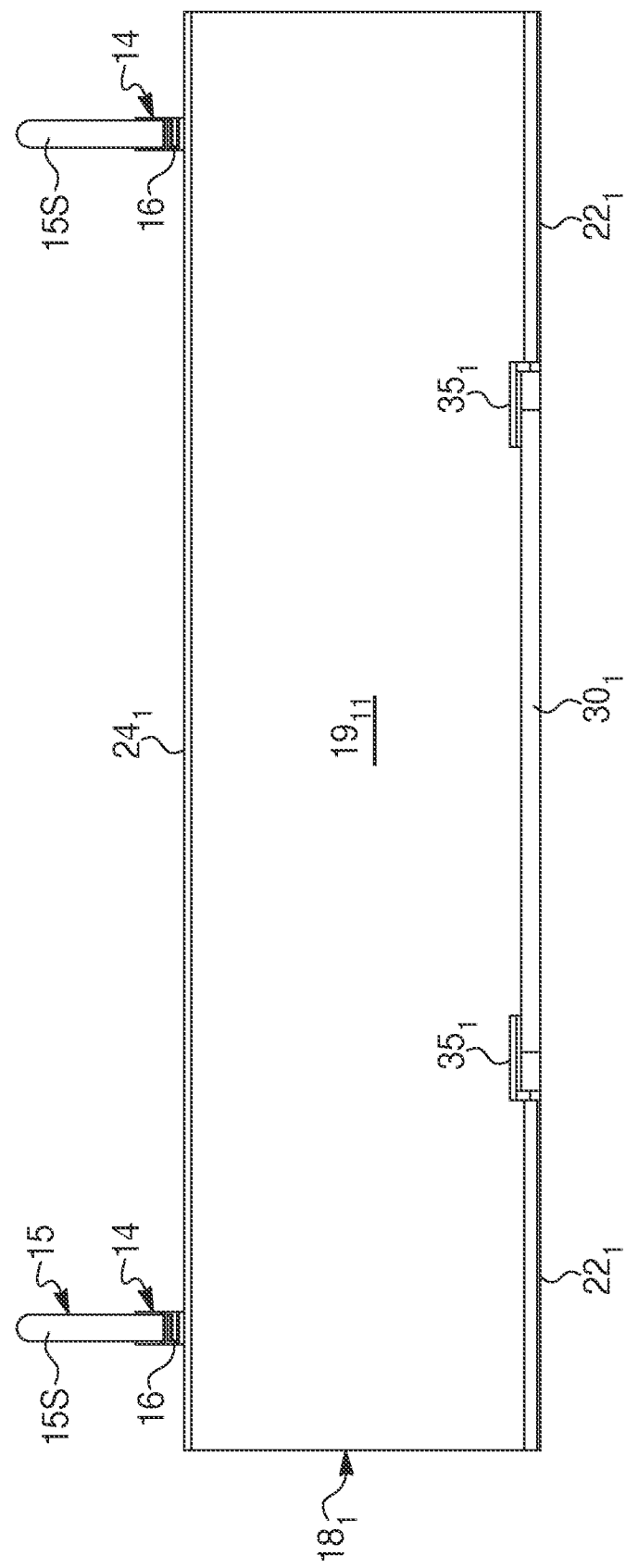
FIG. 4 is a front view of the door mounting support.
Figure 5:
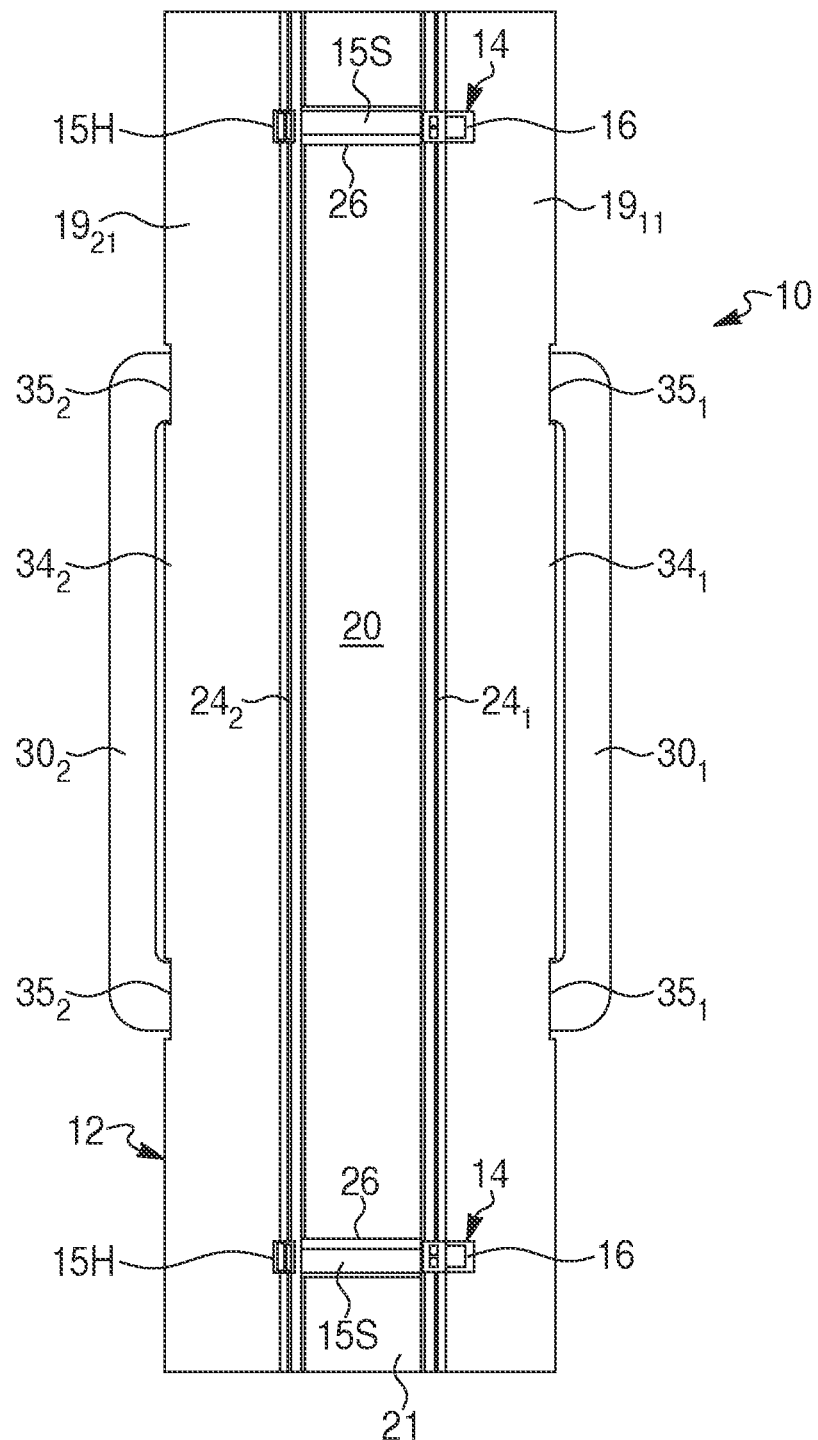
FIG. 5 is a top view of the door mounting support.
Figure 6:
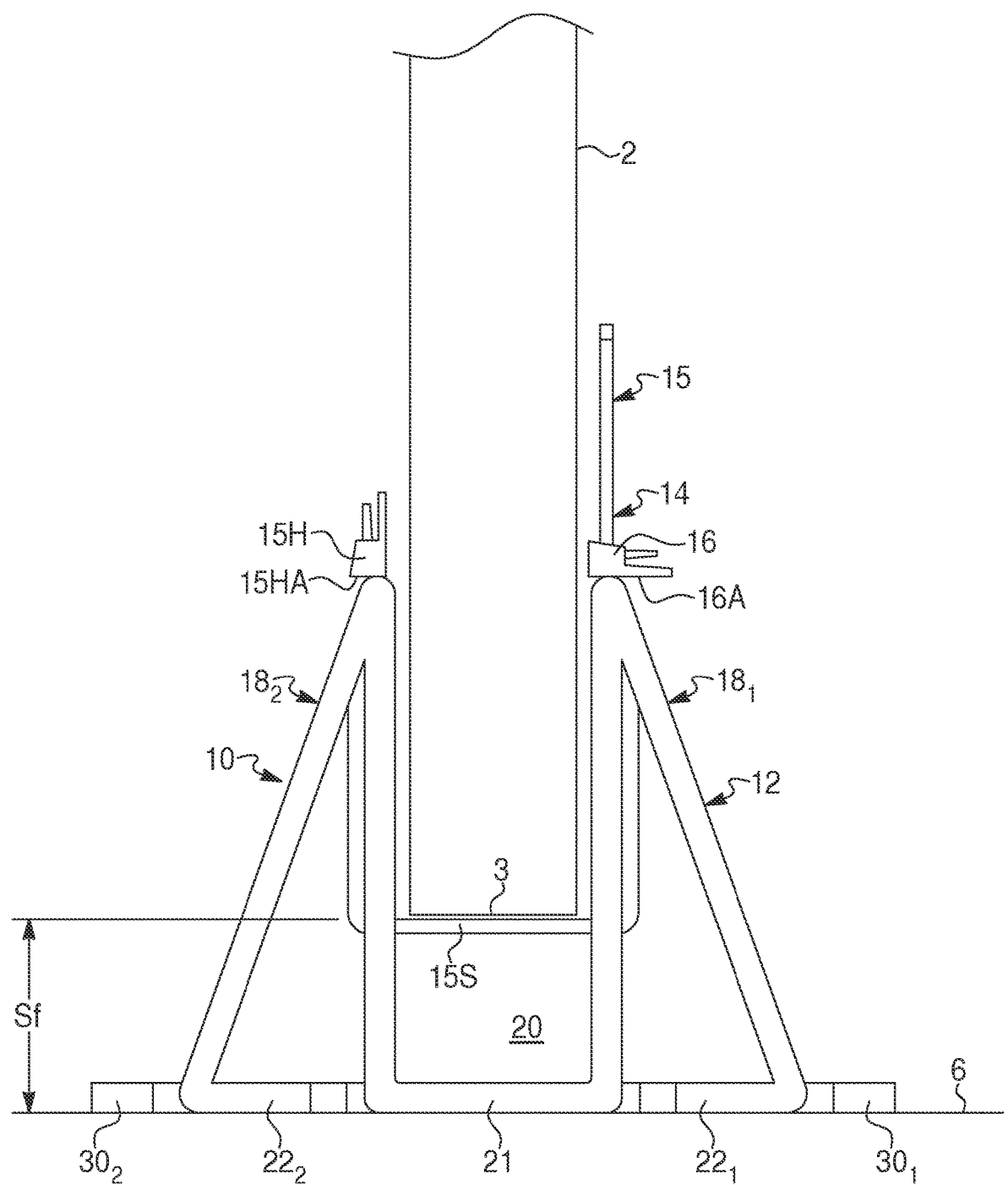
FIG. 6 is a side view of the door mounting support supporting the door slab.

FIGS. 1A and 1B depict an adaptable (or adjustable) door mounting support (or stand) 10 according to an exemplary embodiment of the present invention. The adaptable door mounting support 10 is configured to acquire the door gap, which is defined as the distance Sf between the bottom edge 3 of a door slab 2 (such as an existing door slab) mounted to a door frame 4 through door hinges 5 and a floor 6, as best shown in FIGS. 2 and 6. The door mounting support 10 also supports the door slab 2 (such as a replacement door slab), as shown in FIGS. 3 and 6, at the same distance Sf from the floor 6 as the existing door slab to facilitate installation of the replacement door slab to the door frame 4.

The adaptable door mounting support 10 comprises a frame member 12 and one or more (preferably two, as shown in FIGS. 1A, 1B and 3-5) tie devices 14. The tie devices 14 meter the height of the existing door slab from the floor 6, and hold the new door slab in place at the metered height (i.e., to provide a vertical support for the door slab 2) during installation of the new door slab.

The frame member 12 is preferably constructed of a foldable material, such as corrugated cardboard. Frame member 12 includes first and second upright A-shaped (or inverted V-shaped) segments $18_1$ and $18_2$, respectively, interconnected by a rectangular bottom section 21, and together forming a door support channel (or slot) 20 therebetween. It will be appreciated that the frame members 12 may be made of other appropriate materials, such as corrugated plastic.

Figure 7:
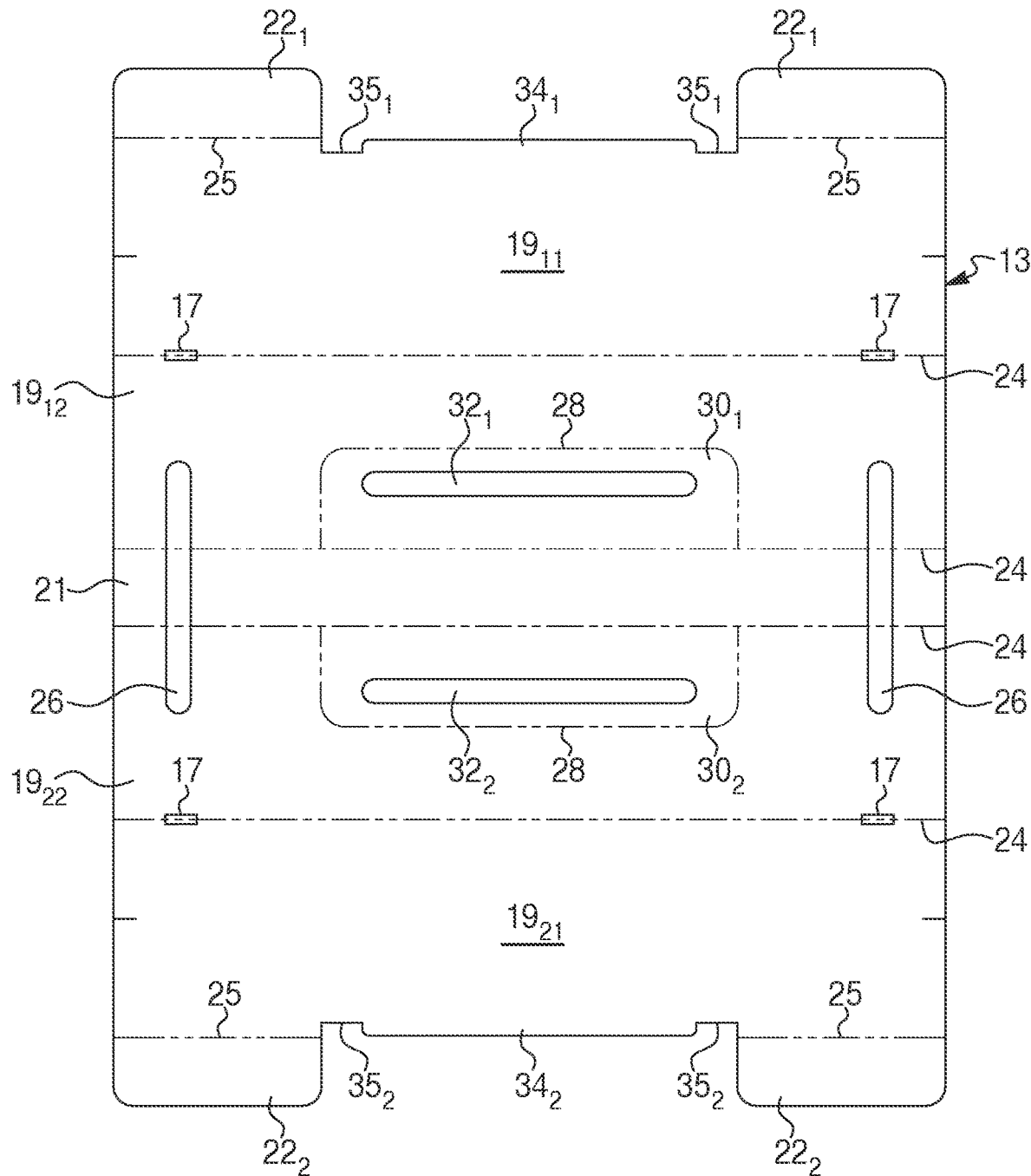
FIG. 7 is a top view of a flat sheet used to form the door mounting support.

As best shown in FIG. 7, the frame member 12 is made from a flat rectangular sheet 13 of corrugated cardboard having a plurality of (such as five, as shown in FIG. 7) transverse, parallel fold lines 24, such as pre-scored fold lines, extending across the entire width of the flat sheet 13. Flat sheet 13 may be folded along the fold lines 24 to erect the flat rectangular sheet 13 into the frame member 12 and/or prepare the sheet 13 for receipt of ties 14. The transverse pre-scored fold lines 24 divide the flat sheet 13 into five interconnected rectangular sections: first and second outer rectangular sections $19_{11}$ and $19_{21}$, respectively, first and second inner rectangular sections $19_{12}$ and $19_{22}$, respectively, and the rectangular bottom section 21 extending between the first and second inner rectangular sections $19_{12}$ and $19_{22}$.

The fold lines 24 allow the outer sections $19_{11}$ and $19_{21}$ to be folded relative to the inner sections $19_{12}$ and $19_{22}$, and the inner sections $19_{12}$ and $19_{22}$ to be folded relative to the bottom section 21 in order form first and second A-shaped segments $18_1$, $18_2$, and to erect the flat sheet 13 into the frame member 12. In this way, the sheet 13 is transformed into the frame member 12 from a flat state, best shown in FIG. 7, to an erected state, best shown in FIGS. 1A, 1B and 3-5. The first A-shaped segment $18_1$ is formed with a first top ridge $24_1$ along the corresponding fold line 24, while the second A-shaped segment $18_1$ is formed with a second top ridge $24_2$ along the corresponding fold line 24. As illustrated in FIGS. 1A and 1B, the tie devices 14 are spaced from each other along the direction parallel to the first and second top ridges $24_1$ and $24_2$ along the corresponding fold lines 24.

The distance between the first and second A-shaped segments $18_1$ and $18_2$ (or between the inner rectangular sections $19_{12}$ and $19_{22}$) of the frame member 12 in the transverse direction (i.e., the width Wd of the door support channel 20) is equal to or slightly larger than the thickness of the door slab 2. Typical door slabs are usually about 1.5" to 2.0" thick. Of course, the fold lines 24 may be placed so as to accommodate door slabs of greater or lesser thickness. The door support channel 20 of the frame member 12 is configured to receive a portion of a conventional door slab therein.

Each of the rectangular inner sections $19_{12}$ and $19_{22}$ has two elongated tie apertures 26 extending between the inner rectangular sections $19_{12}$ and $19_{22}$ through the bottom section 21. The elongated tie apertures 26 extend transverse (or orthogonally) to the fold lines 24. Furthermore, each of the inner sections $19_{12}$ and $19_{22}$ is formed with a U-shaped cut line 28, such as formed by perforations. The U-shaped cut lines 28 are located on the inner sections $19_{12}$ and $19_{22}$ of the flat sheet 13 adjacent to the bottom section 21. Each of the U-shaped cut lines 28 starts and ends on the corresponding fold line 24. The U-shaped cut lines 28 define a first fixing plate $30_1$ in the first inner section $19_{12}$ and a second fixing plate $30_2$ in the second inner section $19_{22}$. Both the first fixing plate $30_1$ and the second fixing plate $30_2$ are juxtaposed to the bottom section 21 from opposite sides thereof. As best shown in FIG. 7, the first fixing plate $30_1$ is formed with a first elongated support opening $32_1$, while the second fixing plate $30_2$ is formed with a second elongated support opening $32_2$. Each of the first and second elongated support openings $32_1$ and $32_2$ extends parallel to the fold lines 24.

The flat sheet 13 further includes first corner tabs $22_1$ foldable relative to the first outer rectangular section $19_{11}$ along tab fold lines 25, and second corner tabs $22_2$ foldable relative to the second outer rectangular section $19_{21}$ along the tab fold lines 25, as best shown in FIG. 7. The fold lines 25 separate the first and second outer rectangular sections $19_{11}$ and $19_{21}$ from the first and second corner tabs $22_1$ and $22_2$, respectively. Moreover, the first corner tabs $22_1$ and the second corner tabs $22_2$ are spaced from each other along the direction parallel to the fold lines 24 and 25.

The flat sheet 13 also has first and second support tabs $34_1$ and $34_2$, respectively. The first support tab $34_1$ is formed on the first outer rectangular section $19_{11}$ of the flat sheet 13 along an outer edge thereof between the first foldable corner tabs $22_1$ and between two first indentations $35_1$. The second support tab $34_2$ is formed on the second outer rectangular section $19_{22}$ of the flat sheet 13 along an outer edge thereof between the second foldable corner tabs $22_2$ and between two second indentations $35_2$. The first and second support tabs $34_1$ and $34_2$ are configured to be received in the first and second elongated support openings $32_1$ and $32_2$, respectively.

Each of the tie devices 14 includes a cable tie (or zip tie) 15 and an adjustable locking member (or retaining member) 16, typically a toothed connector, attached to the cable tie 15 by sliding over a free distal end of a strap 15S of the cable tie 15 toward head member 15H provided on a proximal end thereof to lock the cable tie 15 in place. The strap 15S of the cable tie 15 is threaded (i.e., passed through) through one of tie holes 17 formed in the first and second top ridges $24_1$, $24_2$ of the first and second A-shaped segments $18_1$, $18_2$ of the frame member 12 (best shown in FIG. 7), and through the tie aperture 26. It will be appreciated that the locking members 16 are slidable along the straps 15S of the cable ties 15, typically only in one direction, specifically from the free distal ends of the cable ties 15 toward the head members 15H. Moreover, the locking member 16 is lockable on the cable tie to adjust the distance Sc between the strap 15S of the cable tie 15 and the bottom section 21 of the frame member 12, as illustrated in FIG. 3. Alternatively, the head member 15H also may be slidable over the straps 15S of the cable ties 15 only in one direction, specifically toward the locking members 16. Those skilled in the art recognize that cable ties 15 typically have a series of toothed serrations that lock with the head members 15H as the head members 15H slide along the cable tie 15.

As best shown in in FIGS. 3 and 6, the head member 15H and the locking member 16 have large lower surfaces 15HA and 16A, respectively, where they meet the top ridges $24_1$, $24_2$ of the first and second A-shaped segments $18_1$, $18_2$. The lower surfaces 15HA and 16A provide sufficiently broad areas to resist the cable ties 15 pulling through the cardboard material of the frame member 12.

A method for assembling the door mounting support 10 is as follows.

First, the first and second fixing plates $30_1$ and $30_2$ in the first and second inner rectangular sections $19_{12}$ and $19_{22}$ of the flat sheet 13 are separated from the corresponding first and second inner rectangular sections $19_{12}$ and $19_{22}$ along the cut lines 28 by pushing or pulling, so as to disconnect the first and second fixing plates $30_1$ and $30_2$ from the corresponding first and second inner rectangular sections $19_{12}$ and $19_{22}$.

Then, the flat sheet 13 is folded along the fold lines 24 to form the first and second A-shaped segments $18_1$, $18_2$. To do so, each of the first and second outer sections $19_{11}$ and $19_{21}$ of the flat sheet 13 is folded at an acute angle relative to the corresponding one of the first and second inner sections $19_{12}$ and $19_{22}$, and the first and second inner sections $19_{12}$ and $19_{22}$ are folded perpendicularly (i.e., orthogonally) relative to the bottom section 21 in order form the first and second A-shaped segments $18_1$, $18_2$.

Next, the first support tab $34_1$ is inserted into the first support openings $32_1$ to form and secure the first A-shaped segment $18_1$ in an upright position relative to the bottom section 21, while the second support tab $34_2$ is inserted to the second support opening $32_2$ to form and secure the second A-shaped segment $18_2$ in an upright position relative to the bottom section 21, thus assembling the frame member 12.

Then, the first corner tabs $22_1$ are folded relative to the first outer rectangular section $19_{11}$ along the tab fold lines 25 inside the first A-shaped segment $18_1$ and toward the first inner rectangular sections $19_{12}$ to be coplanar with the bottom section 21 and to sit flush with the ground/floor 6. Similarly, the second corner tabs $22_2$ are folded relative to the second outer rectangular section $19_{21}$ along the tab fold lines 25 inside the second A-shaped segment $18_2$ and toward the second inner rectangular sections $19_{22}$ to be coplanar with the bottom section 21 and to sit flush with the ground/floor 6. In this way, the flat sheet 13 of cardboard is transformed from the flat state (shown in FIG. 7) to the erected state of the frame member 12, as shown in FIGS. 1A, 1B and 3-5.

The straps 15S of the cable ties 15 may each be threaded (i.e., passed through) through one of the tie holes 17 formed in the first and second top ridges $24_1$, $24_2$ of the first and second A-shaped segments $18_1$, $18_2$ of the frame member 12 (best shown in FIG. 7), and through the tie apertures 26, as best shown in FIG. 3. Once each of the straps 15S of the cable ties 15 extends completely through the associated holes 17 and the tie aperture 26 in the frame member 12, the locking members 16 are attached to the cable ties 15 by being slid over the straps 15S toward the head members 15H to positions adjacent the free distal ends of the straps 15S, thus forming the door mounting support 10. Alternatively, the flat sheet 13 may be provided flat with the pre-threaded tie devices 14 so that each of the straps 15S of the cable ties 15 extends completely through the associated holes 17 and the tie apertures 26 in the flat sheet 13. Further alternatively, the tie devices 14 may be mounted to the frame member 12 later but before the door mounting support 10 is used to acquire the door gap Sf and/or to support the door slab 2 at a height off the ground 6.

The method of operation (or use) of the door mounting support 10 is as follows.

In use, as best shown in FIG. 6, the bottom section 21 of the frame member 12 (i.e., of the sheet 13 in the erected state) extends along the floor 6. The inner rectangular sections $19_{12}$ and $19_{22}$ of the frame member 12 extend upright relative to the floor 6, thus forming the door support channel 20 delimited by the bottom section 21 between inner rectangular sections $19_{12}$ and $19_{22}$. In this way, the first and second inner rectangular sections $19_{12}$ and $19_{22}$ are positioned perpendicularly relative to the rectangular bottom section 21 and together form the door support channel 20 therebetween, as best shown in FIGS. 1A, 1B and 3. Moreover, each of the first and second outer rectangular sections $19_{11}$ and $19_{21}$ is disposed at an acute angle relative to one of the corresponding first and second inner rectangular sections $19_{12}$ and $19_{22}$.

Then, the straps 15S of the cable ties 15 are each threaded (i.e., passed through) through one of the tie holes 17 formed in the first and second top ridges $24_1$, $24_2$ of the first and second A-shaped segments $18_1$, $18_2$ of the frame member 12 (best shown in FIG. 7), and through the tie apertures 26. Once each of the straps 15S of the cable ties 15 extends completely through the associated holes 17 and the tie apertures 26 in the frame member 12, the locking members 16 are attached to the cable ties 15 by being slid over the straps 15S toward the head members 15H to positions adjacent to the free distal ends of the straps 15S, thus forming the door mounting support 10. Alternatively, the tie devices 14 may be mounted to the frame member 12 before the door mounting support 10 is used to acquire the door gap Sf and/or to support the door slab 2 at a height off the ground 6.

Next, in order to acquire the dimension Sf, the installer positions (by sliding) the door mounting support 10 under the bottom end portion of the existing door slab 2 hung on the door frame 4. In this way, the bottom edge 3 of the door slab 2 is disposed in the door support channel 20 of the door mounting support 10. Next, the free distal ends of the straps 15S are pulled so that a portion of each strap 15S is raised to touch the bottom edge 3 of the door slab 2. Once the straps 15S of the cable ties 15 firmly engage the bottom edge 3 of the door slab 2 (i.e., reach the height of the door gap Sf), the locking members 16 are slid by the installer toward the head member 15H, thus tightening the cable ties 15 and locking the door mounting support 10 into shape and providing strength to the frame member 12 (as best shown in FIGS. 3 and 6). As a consequence, the door mounting support 10 is locked into shape and place by pulling on the straps 15S of the cable tie 15 while using the locking members 16. Because of the straps 15S of the cable ties 15 and their locking members 16, the door mounting support 10 is set at a position where the dimension Sf is acquired as a consequence of the bottom edge 3 of the door slab 2 resting on the cable ties 15 of the door mounting support 10.

In this way, the door mounting support 10 acquires (i.e., determines or captures) the door gap Sf (i.e., the distance of the bottom edge 3 of the door slab 2 from the floor 6). The door support 10 is capable of capturing any door gap Sf between about ⅜" to 1½", which is sufficient for most installations. As a result, the door mounting support 10 is adjustable to accommodate door assemblies with various door gaps Sf.

During installation of a replacement (or new) door slab, the assembled door mounting support 10 with the captured door gap Sf from the previous door slab is first placed on the floor 6 so as to be ready to support the replacement door slab. Then, the replacement door slab 2 is placed upright onto the door mounting support 10 (as shown in FIG. 6), thus positioning the replacement door slab 2 at the same distance Sf from the floor 6 as the previous (old) door slab to facilitate installation of the replacement door slab to the door frame 4. More specifically, the bottom edge 3 of the new/replacement door slab 2 is positioned in the door support channel 20 of the door mounting support 10 at the same height as the original door slab 2 and is held at that height be the door support 10. When the installation of the replacement door slab 2 is completed (i.e., when the replacement door slab 2 has been fastened to door hinges), the door mounting support 10 is removed from under the replacement door slab, e.g., by cutting the straps 15S of the cable ties 15 and/or sliding the door mounting support 10 away from the door slab 2.

The door mounting support of the present invention is able to acquire the vertical door gap of the existing door slab and to support the replacement door slab at the same height to facilitate installation of the new/replacement door slab. Because the new/replacement door slab is at the same height as the original door slab, location and mounting to the door hinges also is facilitated. The door mounting support of the present invention allows for quick acquisition of the door gap and achieves the secondary purpose of balancing the new or replacement door for easier installation. The door mounting support of the present invention considerably simplifies door installation procedures, thus allowing a DIY installer to more easily accomplish the task of door replacement.

The foregoing description of the exemplary embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. An adaptable door mounting support for acquiring a door gap and for supporting a door slab at a height off a floor equal to the door gap, the door gap defined as the distance between the bottom edge of the door slab pivotally mounted to a door frame through door hinges and the floor, the door mounting support comprising:
    a frame member including first and second A-shaped segments interconnected by a rectangular bottom section and together defining a door support channel therebetween adapted to receive a portion of the door slab therein, the width of the door support channel is configured to be equal to or larger than the thickness of the door slab; and
    at least one tie device configured to meter the door gap and hold the door slab in place at the height off the ground equal to the door gap;
    each of the first and second A-shaped segments formed with a corresponding first or second top ridge;
    the at least one tie device including a cable tie extending between the first and second top ridges and across the door support channel and an adjustable locking member attached to the cable tie by sliding over the cable tie;
    the adjustable locking member slidable over the cable tie and lockable on the cable tie to adjust the distance between the cable tie and the bottom section of the frame member.

2. The adaptable door mounting support as defined in claim 1, wherein the frame member is made of a flat rectangular sheet in a flat state transformable to an erected state wherein the flat rectangular sheet is erected into the frame member of the door mounting support.

3. The adaptable door mounting support as defined in claim 2, wherein the flat rectangular sheet is made of corrugated cardboard.

4. The adaptable door mounting support as defined in claim 2, wherein the flat rectangular sheet has a plurality of parallel fold lines extending across an entire width of the flat sheet, wherein the flat rectangular sheet includes first and second outer rectangular sections, first and second inner rectangular sections each separated from the corresponding one of the first and second outer rectangular sections by one of the fold lines, and the rectangular bottom section extending between the first and second inner rectangular sections, wherein the first and second inner rectangular sections are interconnected by the rectangular bottom section, and wherein each of the first and second inner rectangular sections is separated from the rectangular bottom section by one of the fold lines.

5. The adaptable door mounting support as defined in claim 4, wherein the first and second inner sections are positioned perpendicularly relative to the bottom section and together form a door support channel therebetween, and wherein each of the outer rectangular sections is disposed at an acute angle relative to one of the two inner sections.

6. The adaptable door mounting support as defined in claim 5, wherein each of the first and second inner rectangular sections has at least one elongated tie aperture extending between the first and second inner rectangular sections through the bottom section.

7. The adaptable door mounting support as defined in claim 6, wherein the cable tie is threaded through tie holes formed in the first and second top ridges of the first and second A-shaped segments of the frame member and through the at least one tie aperture.

8. The adaptable door mounting support as defined in claim 5, wherein the at least one tie device includes two tie devices spaced from one another along a direction parallel to the first and second top ridges, and wherein the at least one elongated tie aperture includes two elongated tie apertures spaced from one another along the direction parallel to the fold lines.

9. The adaptable door mounting support as defined in claim 8, wherein the cable tie of each of the tie devices is threaded through tie holes formed in the first and second top ridges of the first and second A-shaped segments of the frame member and through one of the elongated tie apertures.

10. The adaptable door mounting support as defined in claim 5, wherein each of the first and second inner sections is formed with a U-shaped cut line adjacent to the bottom section, and wherein each of the U-shaped cut lines defines one of a corresponding first fixing plate in the first inner section and a second fixing plate in the second inner section each juxtaposed to the bottom section from opposite sides thereof.

11. The adaptable door mounting support as defined in claim 10, wherein the first fixing plate is formed with a first elongated support opening, the second fixing plate is formed with a second elongated support opening, and each of the first and second elongated support openings extends parallel to the fold lines.

12. The adaptable door mounting support as defined in claim 11, wherein the flat rectangular sheet has a first support tab formed on the first outer rectangular section along an outer edge thereof between a first foldable corner tab and between two first indentations, and a second support tab formed on the second outer rectangular section along an outer edge thereof between a second foldable corner tab and between two second indentations, and wherein the first and second support tabs are configured to be received in the first and second elongated support openings, respectively.

13. The adaptable door mounting support as defined in claim 1, wherein the cable tie includes a strap having a free distal end and a head member provided on a proximal end thereof, and wherein the locking member is slidable along the straps of the cable ties only in one direction.

14. A method for assembling an adaptable door mounting support for acquiring a door gap and for supporting a door slab at a height off a floor equal to the door gap, the door gap defined as a distance between a bottom edge of the door slab pivotally mounted to a door frame through door hinges and the floor, the method comprising the steps of:

providing a rectangular sheet including:
a plurality of parallel fold lines extending across an entire width of the rectangular sheet,
first and second inner rectangular sections each separated from a corresponding one of first and second outer rectangular sections by one of the fold lines,
a rectangular bottom section extending between the first and second inner rectangular sections, the first and second inner rectangular sections interconnected by the rectangular bottom section, each of the first and second inner rectangular sections separated from the rectangular bottom section by one of the fold lines,
a first support tab formed on the first outer rectangular section along an outer edge thereof between a first foldable corner tab and between two first indentations, and
a second support tab formed on the second outer rectangular section along an outer edge thereof between a second foldable corner tab and between two second indentations,
each of the first and second inner sections formed with a U-shaped cut line adjacent to the bottom section, each of the U-shaped cut lines defining one of corresponding first fixing plate in the first inner section and a second fixing plate in the second inner section each juxtaposed to the bottom section from opposite sides thereof,
each of the first and second inner rectangular sections having at least one elongated tie aperture extending between the first and second inner rectangular sections through the bottom section,
the first fixing plate formed with a first elongated support opening, the second fixing plate formed with a second elongated support opening, each of the first and second elongated support openings extending parallel to the fold lines;
separating the first and second fixing plates in the first and second inner rectangular sections from the corresponding first and second inner rectangular sections along the cut lines so as to disconnect the first and second fixing plates from the corresponding first and second inner rectangular sections;
folding the first and second inner sections relative to the bottom section;
folding the first and second outer sections at an acute angle relative to the corresponding one of the first and second inner sections;
inserting the first and second support tabs into the first and second support openings to form and secure first and second A-shaped segments each in an upright position relative to the bottom section, each of the first and second A-shaped segments formed with a corresponding first or second top ridge;
providing at least one tie device, each of the tie devices including a cable tie and an adjustable locking member slidable over the cable tie in one direction only;
passing the cable tie of the at least one tie device between the first and second top ridges and through the at least one elongated tie aperture; and
attaching the locking member of the at least one tie device to a free distal end of the cable tie thereof by sliding over the cable tie.

15. The method as defined in claim 14, wherein the step of providing the at least one tie device includes providing two tie devices spaced from one another along the direction parallel to the first and second top ridges, and wherein the step of providing the at least one elongated tie aperture includes providing two elongated tie apertures spaced from one another along the direction parallel to the fold lines.

16. The method as defined in claim 15, comprising the steps of:

passing the cable tie of each of the tie devices between the first and second top ridges of the first and second A-shaped segments and through one of the elongated tie apertures; and attaching the locking member of each of the tie devices to one of the cable ties thereof by sliding over a free distal end of one of the cable ties.

17. The method as defined in claim 14, comprising the step of folding each of the first and second corner tabs relative to the corresponding one of the first and second outer sections toward and coplanar with the bottom section.

18. The method as defined in claim 14, wherein the rectangular sheet is made of corrugated cardboard.

19. A method of using an adaptable door mounting support for acquiring a door gap and for supporting a door slab at a height off a floor equal to the door gap, the door gap defined as a distance between a bottom edge of the door slab pivotally mounted to a door frame through door hinges and the floor, the method comprising the steps of:

providing an adaptable door mounting support including a frame member and at least one tie device configured to meter the door gap and hold the door slab in place at the height off the ground equal to the door gap, the frame member having first and second A-shaped segments interconnected by a rectangular bottom section and together defining a door support channel therebetween adapted to receive a portion of the door slab therein, each of the first and second A-shaped segments formed with a corresponding first or second top ridge, the at least one tie device including a cable tie and an adjustable locking member attachable to the cable tie by sliding over the cable tie in one direction only and lockable on the cable tie to adjust a distance between the cable tie and the bottom section of the frame member;

passing the cable tie of the at least one tie device through a section of both of the A-shaped segments of the frame member and attaching the locking member to a free distal end of the cable tie by sliding;

positioning the door mounting support under the door slab hung on the door frame so that the first and second A-shaped segments and the rectangular bottom section are laying on a floor and a portion of the bottom edge of the door slab is disposed in the door support channel;

acquiring the door gap by pulling and raising the cable tie so as to engage the bottom edge of the door slab;

locking the door support into shape by pulling on the cable tie and using the locking member to lock the door support once the cable tie of the door mounting support reach the height of the door gap.

20. The method as defined in claim 19, further comprising the step of placing a replacement door slab in the door support channel of the door mounting support, which is adjusted so as to position the replacement door slab spaced from the floor by a distance equal to the door gap.

21. The method as defined in claim 19, wherein the step of providing the at least one tie device includes providing two tie devices spaced from one another along the direction parallel to the first and second top ridges, and wherein the step of providing the at least one elongated tie aperture includes providing two elongated tie apertures spaced from one another along the direction parallel to the fold lines.

22. The method as defined in claim 21, comprising the steps of:

passing the cable tie of each of the tie devices between the first and second top ridges of the first and second A-shaped segments and through one of the elongated tie apertures;

attaching the locking member of each of the tie devices to one of the cable ties thereof by sliding over a free distal end of one of the cable ties;

acquiring the door gap by pulling and raising the cable tie of the tie devices so as to engage the bottom edge of the door slab; and locking the door mounting support into shape by pulling on the cable ties of the tie devices and using the locking members to lock the door mounting support once the cable ties of the door mounting support reach the height of the door gap.

23. The method as defined in claim 19, wherein the width of the door support channel is equal or larger than a thickness of the door slab.

24. A method for installing a replacement door slab in a door frame instead of an existing door slab, the method comprising the steps of:

providing an adaptable door mounting support including a frame member and at least one tie device, the frame member including first and second A-shaped segments interconnected by a bottom section and together defining a door support channel therebetween adapted to receive a portion of the door slab therein, the at least tie device including a cable tie extending across the door support channel and a locking member attached to the cable tie by sliding the locking member over the cable tie;

positioning the door mounting support under a bottom edge of the existing door slab hung on the door frame so that the bottom edge of the existing door slab is disposed in the door support channel of the door mounting support above the cable tie of the at least tie device;

acquiring a door gap defined as a distance between the bottom edge of the existing door slab and a floor by pulling the cable tie so that a portion of cable tie is raised to touch the bottom edge of the existing door slab;

locking the cable tie in place by pushing the locking member down toward one of the A-shaped segments;

removing the existing door slab from the door frame and from the door mounting support;

placing the replacement door slab on the cable tie in the door support channel of the door mounting support; and securing the replacement door slab to the door frame by the door hinges.

25. The method as defined in claim 24, wherein the width of the door support channel is equal to or larger than the thickness of the door slab.

26. The method as defined in claim 24, wherein further comprising the step of placing a replacement door slab in the door support channel of the door mounting support, which is adjusted so as to position the replacement door slab spaced from the floor by a distance equal to the door gap.

27. The method as defined in claim 24, wherein the step of providing the at least one tie device includes providing two tie devices spaced from one another along the direction parallel to the first and second top ridges, and wherein the step of providing the at least one elongated tie aperture includes providing two elongated tie apertures spaced from one another along the direction parallel to the fold lines.

28. The method as defined in claim 27, comprising the steps of:

passing the cable tie of each of the tie devices between the first and second top ridges of the first and second A-shaped segments and through one of the elongated tie apertures;
attaching the locking member of each of the tie devices to one of the cable ties thereof by sliding over a free distal end of one of the cable ties;
acquiring the door gap by pulling and raising the cable tie of the tie devices so as to engage the bottom edge of the door slab; and
locking the door mounting support into shape by pulling on the cable ties of the tie devices and using the locking members to lock the door mounting support once the cable ties of the door mounting support reach the height of the door gap.

* * * * *